(12) United States Patent
Lutz

(10) Patent No.: US 11,119,729 B2
(45) Date of Patent: Sep. 14, 2021

(54) ALIGNMENT SHIFTING AND INCREMENTING TO DETERMINE A ROUNDED RESULT OF ADDING FIRST AND SECOND FLOATING-POINT OPERANDS

(71) Applicant: Arm Limited, Cambridge (GB)

(72) Inventor: David Raymond Lutz, Austin, TX (US)

(73) Assignee: Arm Limited, Cambridge (GB)

( * ) Notice: Subject to any disclaimer, the term of this patent is extended or adjusted under 35 U.S.C. 154(b) by 243 days.

(21) Appl. No.: 16/367,672

(22) Filed: Mar. 28, 2019

(65) Prior Publication Data
US 2020/0310754 A1    Oct. 1, 2020

(51) Int. Cl.
*G06F 7/485*    (2006.01)
*G06F 7/499*    (2006.01)

(52) U.S. Cl.
CPC .......... *G06F 7/485* (2013.01); *G06F 7/49947* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,088,715 A * | 7/2000 | Oberman | ................ | G06F 7/483 |
| | | | | 708/505 |
| 6,199,089 B1 | 3/2001 | Mansingh | | |
| 6,366,942 B1 * | 4/2002 | Badeau | ................... | G06F 7/485 |
| | | | | 708/497 |
| 2006/0136543 A1 | 6/2006 | Lutz et al. | | |
| 2012/0215823 A1 * | 8/2012 | Lutz | ......................... | G06F 7/76 |
| | | | | 708/209 |

OTHER PUBLICATIONS

Woo-Chan Park et al, "Floating Point Adder/Subtractor Performing IEEE Rounding and Addition/Subtraction in Parallel" *IEICE Transactions on Information and Systems*, vol. E79-D, Apr. 4, 1996, pp. 297-305.

* cited by examiner

*Primary Examiner* — Michael D. Yaary
(74) *Attorney, Agent, or Firm* — Nixon & Vanderhye P.C.

(57) ABSTRACT

A floating-point adding circuitry is provided to add first and second floating-point operands each comprising a significand and an exponent. Alignment shift circuitry shifts a smaller-operand significand to align with a larger-operand significand, based on an exponent difference. Incrementing circuitry generates alternative versions of the larger-operand significand, each version based on a different rounding increment applied to the larger-operand significand. A number of candidate sum values are generated by adding circuits, each candidate sum value representing a sum of the shifted smaller-operand significand and a respective one of the alternative versions of the larger-operand significand. One of the candidate sum values is selected as a rounded result of adding the first and second floating-point operands. This allows floating-point addition to be performed faster as the latency of the rounding increment can be hidden in the shadow of the latency of the alignment shift.

16 Claims, 5 Drawing Sheets

ALIGNMENT SHIFTING AND INCREMENTING TO DETERMINE A ROUNDED RESULT OF ADDING FIRST AND SECOND FLOATING-POINT OPERANDS

BACKGROUND

Technical Field

The present technique relates to the field of data processing. More particularly, it relates to floating-point adding circuitry.

Technical Background

A data processing apparatus may provide support for processing numbers represented in floating-point representation. In a floating-point representation, a number is represented using a significand 1.F, an exponent E and a sign bit S. The sign bit S represents whether the floating-point number is positive or negative. The significand 1.F represents the significant digits of the floating-point number. The exponent E represents the position of a radix point (also known as a binary point) relative to the significand. Hence, by varying the value of the exponent, the radix point can float left and right within the significand, so that for a predetermined number of bits, a floating-point representation can represent a wider range of numbers than a fixed-point representation for which the radix point has a fixed location within the significand. However, use of floating-point representation can cause added complexity in performing additions, as for example when adding two floating-point numbers with different exponents, the significands of the floating-point numbers would need to be aligned prior to adding, based on the difference between the exponents. Also, the extra range which can be represented using floating-point numbers is achieved at the expense of reduced precision since some of the bits are used to store the exponent. Sometimes, a floating-point arithmetic operation may generate a result with more significant bits than the number of bits used for the significand. If this happens, then the result may be rounded to a value that can be represented using the available number of significand bits. Both the alignment and the rounding may introduce extra delay in performing the addition.

SUMMARY

At least some examples provide floating-point adding circuitry to add first and second floating-point operands each comprising a significand and an exponent; the floating-point adding circuitry comprising:

alignment shift circuitry to shift a smaller-operand significand to align the smaller-operand significand with a larger-operand significand, based on an exponent difference representing a difference between the exponents of the first and second floating-point operands, where the smaller-operand significand is the significand of the one of the first and second floating-point operands having the smaller exponent, and the larger-operand significand is the significand of the other of the first and second floating-point operands having the larger exponent;

incrementing circuitry to generate a plurality of alternative versions of the larger-operand significand, each alternative version of the larger-operand significand based on a different rounding increment applied to the larger-operand significand;

a plurality of adding circuits to generate a plurality of candidate sum values, each candidate sum value representing a sum of a shifted smaller-operand significand generated by the alignment shift circuitry and a respective one of the alternative versions of the larger-operand significand generated by the incrementing circuitry; and selection circuitry to select one of the candidate sum values generated by the plurality of adding circuits, the selected sum value representing a rounded result of adding the first and second floating-point operands.

At least some examples provide floating-point adding circuitry to add first and second floating-point operands each comprising a significand and an exponent; the floating-point adding circuitry comprising:

means for shifting a smaller-operand significand to align the smaller-operand significand with a larger-operand significand, based on an exponent difference representing a difference between the exponents of the first and second floating-point operands, where the smaller-operand significand is the significand of the one of the first and second floating-point operands having the smaller exponent, and the larger-operand significand is the significand of the other of the first and second floating-point operands having the larger exponent;

means for generating a plurality of alternative versions of the larger-operand significand, each alternative version of the larger-operand significand based on a different rounding increment applied to the larger-operand significand;

a plurality of means for adding to generate a plurality of candidate sum values, each candidate sum value representing a sum of a shifted smaller-operand significand generated by the means for shifting and a respective one of the alternative versions of the larger-operand significand generated by the means for generating; and means for selecting one of the candidate sum values generated by the plurality of means for adding, the selected sum value representing a rounded result of adding the first and second floating-point operands At least some examples provide a method for adding first and second floating-point operands each comprising a significand and an exponent; the method comprising:

shifting a smaller-operand significand to align the smaller-operand significand with a larger-operand significand, based on an exponent difference representing a difference between the exponents of the first and second floating-point operands, where the smaller-operand significand is the significand of the one of the first and second floating-point operands having the smaller exponent, and the larger-operand significand is the significand of the other of the first and second floating-point operands having the larger exponent;

generating a plurality of alternative versions of the larger-operand significand, each alternative version of the larger-operand significand based on a different rounding increment applied to the larger-operand significand;

performing a plurality of additions to generate a plurality of candidate sum values, each candidate sum value representing a sum of a shifted smaller-operand significand generated by the alignment shift circuitry and a respective one of the alternative versions of the larger-operand significand generated by the incrementing circuitry; and selecting one of the candidate sum values generated by the plurality of additions, the selected sum value representing a rounded result of adding the first and second floating-point operands.

Further aspects, features and advantages of the present technique will be apparent from the following description of examples, which is to be read in conjunction with the accompanying drawings.

DESCRIPTION OF EXAMPLES

Figure 1:
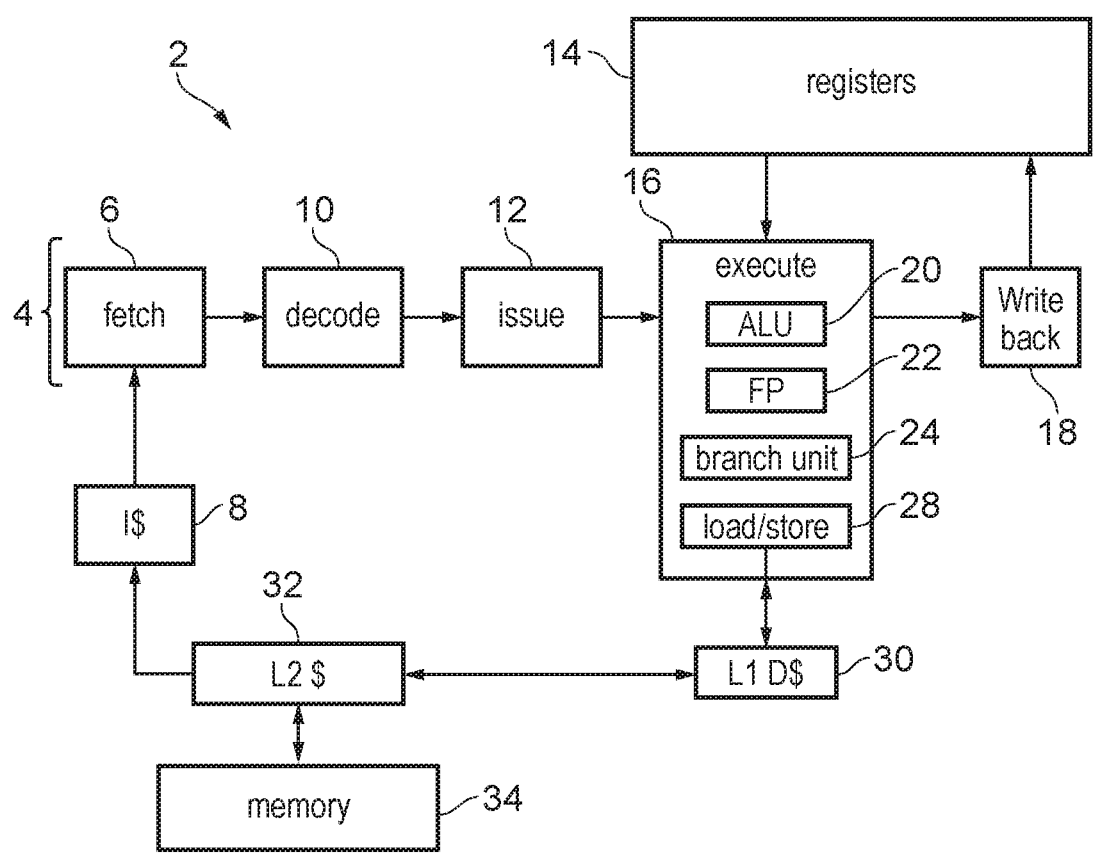
FIG. 1 schematically illustrates an example of a data processing apparatus.

Floating-point adding circuitry is provided to add first and second floating-point operands each comprising a significand and an exponent. The floating-point adding circuitry has alignment shift circuitry for shifting a smaller-operand significand (the significand of the one of the first and second floating-point operands that has the smaller exponent) by a certain number of bit positions to align the smaller-operand significand with the larger-operand significand (the significand of the other of the first and second floating-point operands which has the larger exponent). The number of bit positions used for the alignment shift may depend on an exponent difference (the difference between the exponents of the first and second floating-point operands).

In one approach to handling floating-point additions, after aligning the operands by applying a shift, the shifted smaller-operand significand would then be added to the larger-operand significand, to produce a sum result. Rounding is then applied by first determining whether a rounding increment is necessary, based on bits shifted out of the smaller-operand significand by the shifter and the least significant bit of the sum result, and then if it is determined that a rounding increment is necessary, adding the rounding increment to the sum result. Hence, in this approach the alignment shift of the smaller-operand significand, addition of the larger-operand significand and aligned smaller-operand significand, and addition of the rounding increment addition would all happen sequentially.

However, there is an increasing desire to improve performance by enabling processors to operate at higher clock frequencies. As clock frequencies rise, there is an increasing challenge in fitting all the work required for performing the floating-point addition into a single clock cycle. Generally, the circuit designer has the choice of either reducing the clock frequency, in which case there would be a performance impact because other processing operations with less tight timing constraints would be slowed down, or performing the floating-point addition over multiple clock cycles, which may reduce performance for floating-point additions, which may have a significant impact on performance as floating-point additions are relatively common in some software applications. In practice, a typical floating-point add unit would use the second approach, and perform a floating-point addition across multiple clock cycles so that a higher clock frequency can be used to avoid delaying other operations which require less circuit logic depth.

The inventor recognised that the alignment shift to shift the smaller operand significand is relatively slow, and that while the shifting is being performed, the larger-operand significand may not need a significant amount of processing. Also, the inventor recognised that it is not necessary to wait until the final sum of the larger-operand significand and shifted smaller-operand significand is available before applying the rounding increment. Instead, it is possible to apply the rounding increment to the larger-operand significand before adding the larger-operand significand to the smaller-operand significand, so that the delay associated with adding the rounding increment can be hidden in the shadow of the delay associated with the alignment shift of the smaller-operand significand.

This approach can be seen as counter-intuitive, since it may not be known whether a rounding increment is required at all, until the shifted smaller-operand significand and sum of the larger-operand significand and shifted-smaller-operand significand are available. However, this can be addressed by generating two or more alternative versions of the larger-operand significand, each based on a different rounding increment, and then adding each of the respective versions of the larger-operand significand to the shifted smaller-operand significant to produce a number of candidate sum values. Selection circuitry may then select between the candidate sum values to determine which one should be used as the final result which represents the rounded result of adding the first and second floating-point operands.

Hence, the floating-point adding circuitry has incrementing circuitry provided to generate two or more alternative versions of the larger-operand significand, each based on a different rounding increment applied to the larger-operand significand. Two or more adding circuits are provided to generate two or more candidate sum values. Each candidate sum value represents a sum of the shifted smaller-operand significand generated by the alignment shift circuitry and a respective one of the alternative versions of the larger-operand significand generated by the incrementing circuitry. The selection circuitry selects one of the candidates sum values generated by the adding circuit, to provide the rounded result of the addition of the first and second floating-point operand.

Hence, with this approach the rounded result can be obtained much faster, so that it is possible to perform a floating-point addition involving alignment of significands and rounding within a single clock cycle even at relatively high clock frequencies, which may otherwise not be practical. This can make a significant difference to performance.

The incrementing circuitry may perform at least one addition for generating the alternative versions of the larger operand significand. Each addition may add a respective rounding increment to the larger-operand significand. The incrementing circuitry may perform its incrementing addition(s) in parallel with the alignment shift circuitry performing at least part of the shift of the smaller-operand significand. Hence, this avoids the need to incur a latency of a rounding addition after the sum of the aligned significand has been generated by the adding circuit, which improves performance.

In some examples, the alternative versions of the larger-operand significand could comprise: a first version based on the rounding increment of 0, and a second version based on a rounding increment of 1. These may correspond to cases when no rounding increment is required and a rounding increment is required respectively.

However, in practice, it is also possible that the sum of the aligned smaller- and larger-operand significands could result in an overflow, in which case a normalisation of the result could result in the most significant bit being one place higher than in the absence of overflow, and in this case the rounding increment would need to be applied one bit position higher than in the absence of overflow. To avoid needing to perform a shift or an extra addition after the sum of the smaller- and larger-operand significands has been calculated by the respective adding circuits, a third version of the larger-operand significand may be generated for which the rounding increment is 2, effectively representing addition of a rounding increment at one bit position higher than in the non-overflow case. Hence, the respective alternative versions of the larger-operand significand may comprise: a first version based on the rounding increment of 0, a second version based on a rounding increment of 1 and a third version based on a rounding increment of 2. By calculating sums of each of these versions of the larger-operand significand with the smaller-operand significand, then each of the possible rounded result values that could be required are already generated by the plurality of adding circuits, so that the selection circuitry can simply select one of these values without needing an extra addition for rounding.

Hence, as the first versions of the larger-operand significand is based on a rounding increment of 0, it will be appreciated that the first version is simply identical to the input value of the larger-operand significand. Hence, generation of the first version does not require an addition by the incrementing circuitry—the larger-operand significand can simply be passed straight through to the corresponding adding circuit. However, the incrementing circuitry performs additions to generate the second or third versions. The latency of adding the rounding increments is incurred in parallel with the alignment shift latency to improve performance.

The selection circuitry may select between the candidate sum values based on rounding status flags, which may provide information on the values of bits shifted out of the smaller-operand significand in the alignment shift and/or the least significant bit of the sum result. For a typical floating-point adder, rounding status flags would normally be determined after performing the alignment shift on the smaller-operand significand, based on the bits shifted out by the shifter.

However, in the approach discussed below, the rounding status determining circuitry may determine a subset of the rounding status flags based on an unshifted version of the smaller-operand significand. This means that at least part of the determination of the subset of rounding status flags can be performed in parallel with the alignment shift circuitry performing at least part of the shift of the smaller-operand significand, which improves performance by reducing the overall delay of the add operation. For example, the rounding status determining circuitry may determine at least one mask based on the exponent difference between the exponents of the first and second floating-point operands. The rounding status determining circuitry may apply the at least one mask to the unshifted version of the smaller-operand significand, to determine the subset of rounding status flags.

In particular, the subset of rounding status flags which can be determined using such a mask may include at least one guard flag and at least one sticky flag. The guard flag may represent a bit value of the most significant bit of the smaller-operand significand that is shifted out when performing the alignment shift (i.e. the bit one place to the right of the bit that becomes the least significant bit of the shifter smaller-operand significand).

The rounding status flags may also include at least one least significant bit flag which is determined based on an addition performed by one of the adding circuits. The least significant bit flag may correspond to the value of the least significant bit in the sum resulting from the addition the larger-operand significand and the shifted smaller-operand significand (based on the first version of the larger-operand significand which is based on the rounding increment of 0). While the least significant bit flag cannot be determined by masking, it will still typically be available early in the addition by the adding circuit, because the adding circuit will tend to calculate lower bits earlier than bits of higher significance, and so this may provide enough time to control the rounding selection between the candidate sum values based on the least significant bit flag. Also, a guard flag to be used in the event of an overflow could also be determined based on an addition performed by one of the adding circuits, as it may equal to the least significant bit flag in the non-overflow case.

As mentioned above, it is possible that the addition performed based on the larger-operand significand and the shifted smaller-operand significand could cause an overflow. Hence the selection circuitry may select between the candidate sum values based not only on the rounding status flags but also on overflow indication indicating whether addition of the aligned significands of the first and second floating-point operands causes an overflow. For example, if there is an overflow and a rounding increment is required, the candidate sum value based on the third version of the larger-operand significand may be selected by the selection circuitry, while if there is no overflow and a rounding increment is required, the candidate sum value based on the second version of the larger-operand significand may be selected.

Whether a rounding increment is required or not may be determined separately for the overflow and non-overflow cases. To assist with this, the rounding status determining circuitry, together with at least one of the adding circuits, may determine a non-overflow set of rounding status flags assuming absence of overflow, as well as an overflow set of rounding status flags assuming presence of overflow. Both the non-overflow set and the overflow set of rounding status flags may be determined before a result of determining that overflow has occurred is available. Again, this helps to improve performance because typically the determination of whether an overflow has occurred has to wait until the most significant bit of the sum performed by the adding circuits is available, which may be relatively slow. Hence, waiting until it is known whether overflow has occurred before calculating the relevant rounding status flags would incur a significant delay. By determining separate sets of rounding status flags for the overflow case and the non-overflow case, this can allow an earlier selection between the candidate sum values than would otherwise be possible. The overflow/non-overflow guard and sticky flags can be calculated by masking as discussed above, and the overflow/non-overflow least significant bit flags can be calculated as the lowest two bits of the result of the sum of the (first version) larger-operand significand and the shifted smaller-operand significand.

The selection between the candidate sum values may be divided into stages, with three separate selections performed. First rounding selection circuitry may select one of the first and second candidate sum values based on the non-overflow set of rounding status flags which are generated assuming there is no overflow. Second rounding selection circuitry may select between first and third candidate sum values based on the overflow set of rounding status flags determined assuming presence of overflow. The first, second and third candidate sum values may be the sum values which are based on the first, second and third versions of the larger-operand significand described above, for which the rounding increment is 0, 1 or 2 respectively. The first and second rounding selection circuitry may operate in parallel with each other, and in parallel with part of the determination of the overflow indication itself. Subsequently, when the overflow indication is available, then overflow selection circuitry select between the outputs of the first and second rounding selection circuitry, based on the overflow indication, and the output selected by the overflow selection circuitry can be used as the rounded result of adding the first/second floating-point operands. This approach improves performance compared to making a 3-way selection because the rounding selection is known before the overflow selection. Combining rounding and overflow multiplex selection logic would delay things due to the control logic (selects are based on logical functions of round and overflow, and that selection logic is slower than the slowest of the round and overflow inputs) and due to the larger 3-way multiplexer.

As mentioned above, the alignment shift to align the smaller-operand significand with the larger-operand significand may be a relatively slow part of the floating-point addition process. To improve performance in the alignment shift, the alignment shift circuitry can start shifting both the significands of the first and second floating-point operands before a result of determining which of the first and second floating-point operands has the smaller exponent is available. For example, the exponent difference may be determined by subtracting one of the exponents from the other, and as the subtraction may typically be performed using a carry-propagate adder, lower bits of the exponent difference may be available before higher bits, as the higher bit calculations would wait until carries from lower bits have rippled up to the higher bit. Which of the operands has the smaller exponent may be determined based on a most significant bit of the exponent difference, and so this may not be determined until after a lower portion of the exponent difference has already been identified. Hence, to improve performance, shifting of the significand of each floating-point can start based on lower portion of an exponent difference value, without knowing which operand actually needs to be shifted, and then once it is known which operand had the smaller exponent, then the corresponding partially shifted significand can be selected for further shifting.

Hence, the alignment shift circuitry may comprise: first shift circuitry to generate a first shifted value by shifting the significand of the first floating-point operand based on a lower portion of a first exponent difference value corresponding to a result of subtracting the exponent of the first floating-point operand from the exponent of the second floating-point operand; second shift circuitry to generate a second shifted value by shifting the significand of the second floating-point operand based on a lower portion of a second exponent difference value corresponding to a result of subtracting the exponent of the second floating-point operand from the exponent of the first floating-point operand; significand selection circuitry to select the first shifted value when the first floating-point operand has the smaller exponent and to select the second shifted value when the second floating-point operand has the smaller exponent; and third shift circuitry to shift the one of the first shifted value and the second shifted value selected by the significand selection circuitry, based on an upper portion of a corresponding one of the first and second exponent difference values.

Hence, with this approach the latency of the first and second shift circuitry can be incurred in parallel with the determination of which of the first and second floating-point operands has the smaller exponent, which means the latency beyond the point when it has been decided which operand has the smaller exponent is lower. With this approach the third shift circuitry can perform its shift in parallel with the incrementing circuitry generating the alternative versions of the larger-operand significand.

A data processing apparatus may include the floating-point adding circuitry discussed above. The floating-point adding circuitry discussed above may not be the only processing path provided for adding floating-point operands. The floating-point adding circuitry discussed above may be used for far-path floating-point additions (additions of like-signed operands, subtractions of unlike-signed operands, additions of unlike-signed operands for which the exponent difference is greater than 1, or subtractions of like-signed operands for which the exponent difference is greater than 1). Separate near-path adding circuitry may be provided for handling additions of unlike-signed operands for which the exponent difference is 0 or 1, or subtractions of like-signed operands for which the exponent difference is 0 or 1. For the near-path adding circuitry, there is no need for a multi-bit alignment shift, but a normalisation shift may be required to handle leading zeroes in the result, and potentially the result could be subnormal. Hence, the floating-point adding circuitry including the alignment shift circuitry, incrementing circuitry, adding circuits and selection circuitry described above may be used for the far-path processing circuitry of a floating-point add unit in a data processing apparatus.

Floating Point Representation

Floating-point (FP) is a useful way of approximating real numbers using a small number of bits. The IEEE 754-2008 FP standard proposes multiple different formats for FP numbers, but the ones that ARM is concerned with are binary 64 (also known as double precision, or DP), binary 32 (also known as single precision, or SP), and binary 16 (also known as half precision, or HP). The numbers 64, 32, and 16 refer to the number of bits required for each format.

FP numbers are quite similar to the "scientific notation" taught in science classes, where instead of negative two million we'd write $-2.0 \times 10^6$. The parts of this number are the sign (in this case negative), the significand (2.0), the base of the exponent (10), and the exponent (6). All of these parts have analogs in FP numbers, although there are differences, the most important of which is that the constituent parts are stored as binary numbers, and the base of the exponent is always 2.

More precisely, FP numbers consist of a sign bit, some number of biased exponent bits, and some number of fraction bits. Some FP formats of interest provide the following bits:

| format | sign | exponent | fraction | exponent bias |
|---|---|---|---|---|
| DP [63:0] | 63 | 62:52 (11 bits) | 51:0 (52 bits) | 1023 |
| SP [31:0] | 31 | 30:23 (8 bits) | 22:0 (23 bits) | 127 |
| HP [15:0] | 15 | 14:10 (5 bits) | 9:0 (10 bits) | 15 |

The sign is 1 for negative numbers and 0 for positive numbers. Every number, including zero, has a sign.

The exponent is biased, which means that the true exponent differs from the one stored in the number. For example, biased SP exponents are 8-bits long and range from 0 to 255. Exponents 0 and 255 are special cases, but all other exponents have bias 127, meaning that the true exponent is 127 less than the biased exponent. The smallest biased exponent is 1, which corresponds to a true exponent of −126. The maximum biased exponent is 254, which corresponds to a true exponent of 127. HP and DP exponents work the same way, with the biases indicated in the table above.

SP exponent 255 (or DP exponent 2047, or HP exponent 31) is reserved for infinities and special symbols called NaNs (not a number). Infinities (which can be positive or negative) have a zero fraction. Any number with exponent 255 and a nonzero fraction is a NaN. Infinity provides a saturation value, so it actually means something like "this computation resulted in a number that is bigger than what we can represent in this format." NaNs are returned for operations that are not mathematically defined on the real numbers, for example division by zero or taking the square root of a negative number.

Exponent zero, in any of the formats, is reserved for subnormal numbers and zeros. A normal number represents the value: $-1^{sign} \times 1.\text{fraction} \times 2^e$, where e is the true exponent computed from the biased exponent. The term 1.fraction is called the significand, and the 1 is not stored as part of the FP number, but is instead inferred from the exponent. All exponents except zero and the maximum exponent indicate a significand of the form 1.fraction. The exponent zero indicates a significand of the form 0.fraction, and a true exponent that is equal to 1-bias for the given format. Such a number is called subnormal (historically these numbers were referred to as denormal, but modern usage prefers the term subnormal). Numbers with both exponent and fraction equal to zero are zeros.

The following table has some example numbers in HP format. The entries are in binary, with '_' characters added to increase readability. Notice that the subnormal entry (4th line of the table, with zero exponent) produces a different significand than the normal entry in the preceding line.

| sign | 5-bit exponent | 10-bit fraction | 11-bit significand | value |
|---|---|---|---|---|
| 0 | 01111 | 00_0000_0000 | 100_0000_0000 | $1.0 \times 2^0$ |
| 1 | 01110 | 10 0000 0000 | 110 0000 0000 | $-1.1 \times 2^{-1}$ |
| 0 | 00001 | 10 0000 0000 | 110 0000 0000 | $1.1 \times 2^{-14}$ |
| 0 | 00000 | 10_0000_0000 | 010_0000_0000 | $0.1 \times 2^{-14}$ |
| 1 | 11111 | 00 0000 0000 | | -infinity |
| 0 | 11111 | 00 1111 0011 | | NaN |

A large part of the complexity of FP implementation is due to subnormals, therefore they are often handled by microcode or software. Processing circuitry which handles subnormals in hardware can speed up these operations by a factor of 10 to 100 compared to a software or microcode implementation.

Integers, Fixed-Point, Floating-Point

The FP way of handling signs is called sign-magnitude, and it is different from the usual way integers are stored in the computer (two's complement). In sign-magnitude representation, the positive and negative versions of the same number differ only in the sign bit. A 4-bit sign-magnitude integer, consisting of a sign bit and 3 significant bits, would represent plus and minus one as:

+1=0001
−1=1001

In two's complement representation, an n-bit integer i is represented by the low order n bits of the binary n+1-bit value $2^n+i$, so a 4-bit two's complement integer would represent plus and minus one as:

+1=0001
−1=1111

The two's complement format is practically universal for signed integers because it simplifies computer arithmetic.

A fixed-point number looks exactly like an integer, but actually represents a value that has a certain number of fractional bits. Sensor data is often in fixed-point format, and there is a great deal of fixed-point software that was written before the widespread adoption of FP. Fixed-point numbers are quite tedious to work with because a programmer has to keep track of the "binary point", i.e. the separator between the integer and fractional parts of the number, and also has to constantly shift the number to keep the bits in the correct place. FP numbers don't have this difficulty, so it is desirable to be able to convert between fixed-point numbers and FP numbers. Being able to do conversions also means that we can still use fixed-point software and data, but we are not limited to fixed-point when writing new software.

Rounding FP Numbers

Most FP operations are required by the IEEE-754 standard to be computed as if the operation were done with unbounded range and precision, and then rounded to fit into an FP number. If the computation exactly matches an FP number, then that value is always returned, but usually the computation results in a value that lies between two consecutive floating-point numbers. Rounding is the process of picking which of the two consecutive numbers should be returned.

There are a number of ways of rounding, called rounding modes; six of these are as follows:

| mode | | definition |
|---|---|---|
| RNE | round-to nearest, ties to even | pick the closest value, or if both values are equally close then pick the even value |
| RNA | round to nearest, ties to away | pick the closest value, or if both values are equally close then pick the value farthest away from zero |
| RZ | round to zero | pick the value closest to zero |
| RP | round to plus infinity | pick the value closest to plus infinity |
| RM | round to minus infinity | pick the value closest to minus infinity |
| RX | round to odd | pick the odd value |

The definition doesn't tell us how to round in any practical way. One common implementation is to do the operation, look at the truncated value (i.e. the value that fits into the FP format) as well as all of the remaining bits, and then adjust the truncated value if certain conditions hold. These computations are all based on:

L (least) the least significant bit of the truncated value

G (guard) the next most significant bit (i.e. the first bit not included in the truncation)

S (sticky) the logical OR of all remaining bits that are not part of the truncation.

Given these three values and the truncated value, we can compute the correctly rounded value according to the following table (Table 1):

TABLE 1

| mode | change to the truncated value |
|---|---|
| RNE | increment if (L&G) | (G&S) |
| RNA | increment if G |
| RZ | none |

TABLE 1-continued

| mode | change to the truncated value |
|---|---|
| RP | increment if positive & (G\|S) |
| RM | increment if negative & (G\|S) |
| RX | set L if G\|S |

For example, consider multiplying two 4-bit significands, and then rounding to a 4-bit significand.
   sig1=1011 (decimal 11)
   sig2=0111 (decimal 7)
multiplying yields
   sig1×sig2=1001_101 (decimal 77)
     L Gss The least significant bit of the truncated 4-bit result is labeled L, the next bit G, and s is the logical OR of the remaining bits labeled s (i.e. s=0|1=1). To round, we adjust our 4-bit result (1001) according to the rounding mode and the computation in the table above. So for instance in RNA rounding, G is set so we return 1001+1=1010. For RX rounding G S is true so we set L to 1 (it's already 1, so in this case nothing changes) and return 1001.

EXAMPLES

FIG. 1 schematically illustrates an example of a data processing apparatus 2. The data processing apparatus has a processing pipeline 4 which includes a number of pipeline stages. In this example, the pipeline stages include a fetch stage 6 for fetching instructions from an instruction cache 8; a decode stage 10 for decoding the fetch program instructions to generate micro-operations to be processed by remaining stages of the pipeline; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages. For example in an out-of-order processor an additional register renaming stage could be included for mapping architectural registers specified by program instructions or micro-operations to physical register specifiers identifying physical registers in the register file 14.

The execute stage 16 includes a number of processing units, for executing different classes of processing operation. For example the execution units may include a scalar arithmetic/logic unit (ALU) 20 for performing arithmetic or logical operations on scalar operands read from a scalar register file 21; a floating-point unit 22 for performing operations on floating-point values, a branch unit 24 for evaluating the outcome of branch operations and adjusting the program counter which represents the current point of execution accordingly; and a load/store unit 28 for performing load/store operations to access data in a memory system 8, 30, 32, 34. In this example the memory system include a level one data cache 30, the level one instruction cache 8, a shared level two cache 32 and main system memory 34. It will be appreciated that this is just one example of a possible memory hierarchy and other arrangements of caches can be provided. The specific types of processing unit 20 to 28 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline architecture, and the processor may include many other elements not illustrated for conciseness, such as branch prediction mechanisms or address translation or memory management mechanisms.

Figure 2:
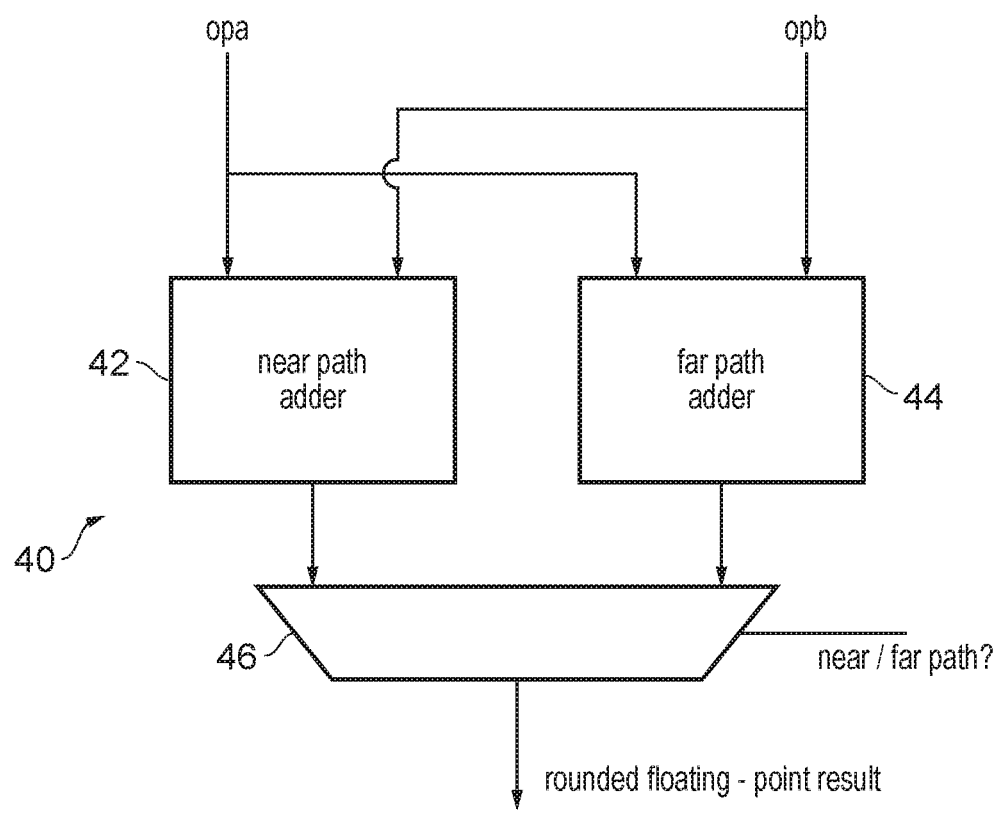
FIG. 2 illustrates a portion of a floating-point add unit.

One operation supported by the floating-point unit 22 may be an addition of two operands opa, opb represented as floating-point numbers. Hence, the floating-point unit 22 may include a floating-point adder 40 as shown in FIG. 2, which may comprise a near-path processing circuit 42 and a far-path processing circuit 44, and a multiplexer or selector 46 to select between the outputs of the near and far-path processing circuits 42, 44. The floating-point add unit may handle both addition and subtraction operations. For add operations, if the two floating-point operands opa, opb have the same sign (both positive or both negative), then this is an effective addition, while if the two operands have different signs (one is positive and the other is negative) then this is effectively a subtraction. For subtraction operations, if the two operands have different signs then this is effectively an addition and if the two operands have the same sign then this is effectively a subtraction. The selection of the far-path or near-path adder may depend on the relative signs of the two operands as well as on whether the instruction being executed is an add or subtract instruction. Below, the term like-signed-add (LSA) refers to effective additions, i.e. add operations where both operands have the same sign or subtract operations where the two operands have different signs. The term unlike-signed-add (USA) refers to effective subtractions, i.e. add operations where the two operands have different signs or subtract operations where the two operands have the same sign.

The near-path adder 42 has specific logic for dealing with USAs in cases where the exponents of the two operands are either the same or differ only by 1. The far-path adder 44 is used for LSAs (regardless of the size of the exponent difference), and for USAs where the exponents differ by more than 1. Hence, the multiplexer 46 selects between the near/far path outputs based on a comparison of signs of opa, opb, a comparison of the exponents of opa, opb and on whether an add or subtract operation has been requested.

The near-path logic 42 may include a leading zero counter for dealing with the possibility that the sum result has a number of leading zeroes which need to be removed by shifting to produce a normalised floating-point value with a significand 1.F. Also, the near-path circuit logic 42 may have circuitry for dealing with subnormal outputs. Such leading zero counts and subnormal handling may not be needed in the far path adder 44. Any known approach may be used for the near-path adder 42. However, one design that can be used for the near-path adder 42 is the one described in U.S. patent application Ser. No. 15/793,063 filed by the same applicant and inventor as this application. The contents of U.S. Ser. No. 15/793,063 are entirely incorporated herein by reference.

The design for the far-path add circuitry 44 is discussed in more detail below. Far path operations generally require alignment because we can only add or subtract bits that represent the same power of two. So if we have to compute:

$$1.100 \times 2^6 - 1.100 \times 2^4,$$

we first have to align the smaller operand to the larger. We do this by right shifting the significand (and incrementing the exponent) of the smaller operand until the two exponents are equal, transforming the problem into the equivalent:

$$1.100 \times 2^6 - 0.011 \times 2^6$$

We then complete the significand addition or subtraction, perform a trivial (zero or one-bit) normalization, and round the result. Normally, a far-path adder would first align the significands, add the aligned smaller-operand significand to the larger-operand significand, perform a normalisation if an overflow occurred, and round the result by applying a rounding increment. However, at the clock frequencies supported by modern processors it can be extremely challenging to pack all of this work into a single clock cycle, and so in practice most far-path adders take multiple cycles to do this operation.

Figure 3:
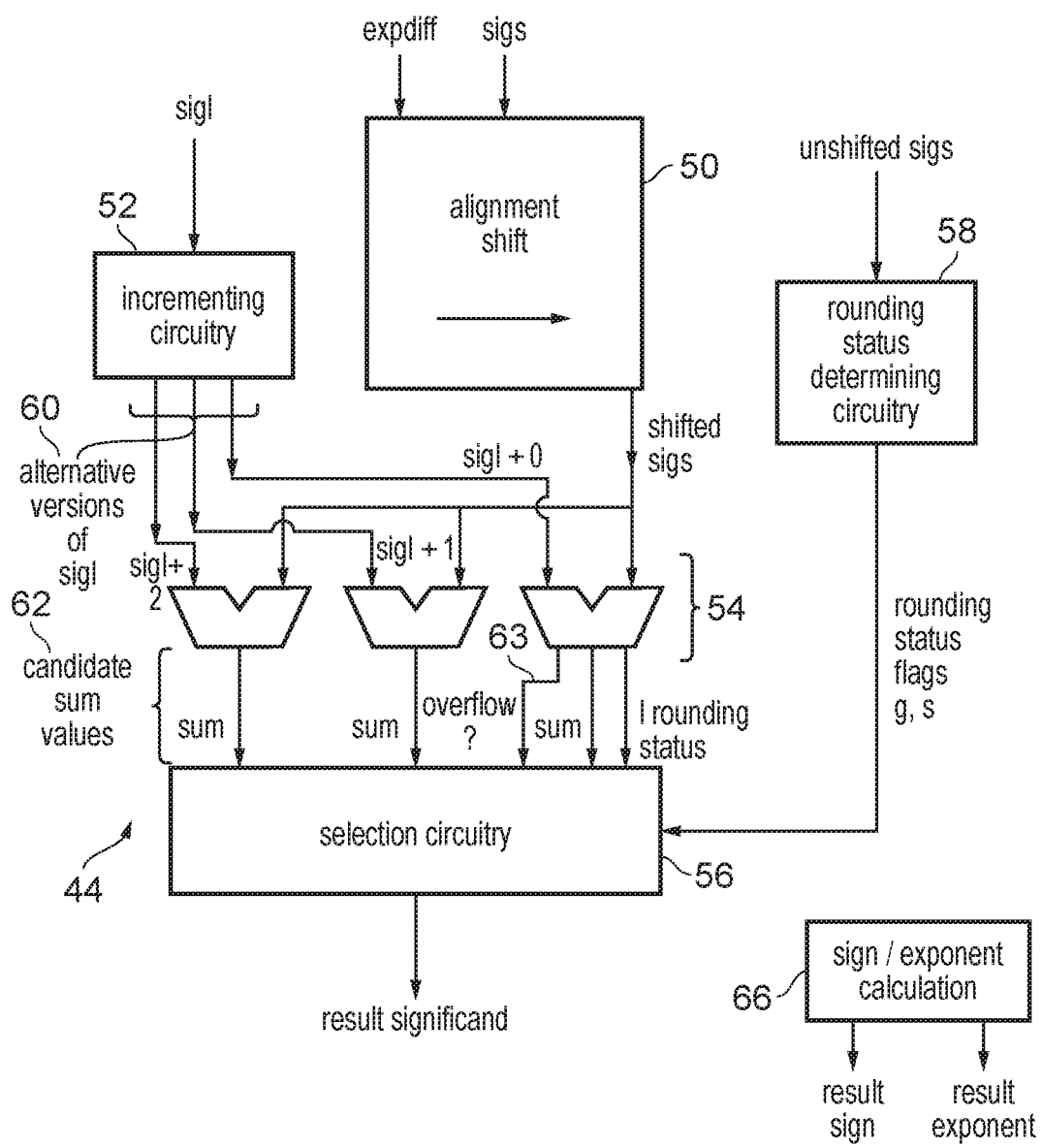
FIG. 3 shows in more detail circuitry for the far-path of the floating-point add unit.

FIG. 3 shows an example of part of the far-path adder circuit 44. In this technique, the far-path addition of opa, opb can be made much faster by performing the additions for applying rounding increments in parallel with the alignment shift of the smaller operands significand, generating several candidate sum values based on each possible rounded increment that could be applied (including consideration of overflow), and then selecting between the candidate sum values based on rounding status flags determined based on the smaller operands significand and the sum results.

Hence, as shown in FIG. 3, the far-path adder 44 may include alignment shift circuitry 50, incrementing circuitry 52, a number of adding circuits 54, selection circuitry 56 and rounding status determining circuitry 58.

The alignment shift circuitry 50 shifts the significand of the one of the operands opa, opb having the smaller exponent by a number of bit positions determined based on an exponent difference between the exponents of the two operands, to align the smaller-operand significand with the larger-operand significand. The label "sigs" is used to refer to the smaller-operand significand (i.e. sigs is the significand of the one of opa, opb having the smaller exponent). The label "sigl" is used to refer to the larger-operand significand (i.e. the significand of the other of opa, opb which has the larger exponent).

In parallel with the alignment shift performed by the alignment shift circuitry 50 to generate a shifted smaller-operand significand (shifted sigs), the incrementing circuitry 52 applies a number of different rounding increments of 0, 1 and 2 to the larger-operand significand sigl to generate a number of alternative versions 60 of sigl, which are supplied to the respective adding circuits 54. Each adding circuit 54 adds the shifted sigs to a respective one of the alternative versions 60 of sigl, to generate a corresponding candidate sum value 62. Hence, three candidate sum values 62 are generated, one corresponding to sigl+sigs, one corresponding to sigl+sigs+1, and one corresponding to sigl+sigs+2.

Selection circuitry 56 selects between the three candidate sum values 62 based on:
(i) a subset of rounding status information [guard and sticky (G, S) flags for overflow/non-overflow cases] determined by the rounding status determining circuitry 58 using the unshifted smaller-operand significand,
(ii) a further subset of rounding status information [least (L) flags for overflow/non-overflow cases] generated by the one of the adding circuits 54 which adds sigs to the first version of sigl which is based on a rounding increment of 0, and
(iii) an overflow indication 63 which indicates whether an overflow in the addition of sigl and sigs.

The determination of the G, S flags by rounding status determination circuitry 58 can be performed in parallel with the alignment shift 50, based on masking of the unshifted version of sigs, rather than needing to wait for the shifted result.

Hence, by speculatively generating several alternative versions of the larger-operand significand based on all of the rounding increments which could be required and generating multiple candidate sums of the shifted smaller-operand significand with the respective alternative versions of the larger-operand significand, this allows the delay associated with the rounding increment additions to be hidden in the shadow of the alignment shift, to speed up the operation and make it more practical for the far-path addition logic to fit within a single cycle. This enables the processor as a whole to operate at higher clock frequencies without needing to split a floating-point addition into multiple cycles.

As shown in FIG. 3, the far-path adder 44 may also have circuit logic 66 for calculating the sign S and exponent E of the result value corresponding to the sum of opa, opb. For LSAs, the result exponent E may simply equal the exponent of the larger of the two operands opa, opb in the case where there is no overflow, or if there is an overflow then the result exponent is equal to the larger operand's exponent plus one. For USAs, the non-overflow exponent is the larger operand's exponent minus one, and the overflow exponent is the larger operand's exponent. The result sign will be equal to the sign of both input operands in the case of a like-signed-addition, and is equal to the sign of the operand having the larger exponent in the case of an unlike-signed-addition. Hence, the sign/exponent calculation logic 66 may have a much shorter logic depth than the significand calculating logic. In practice, it is the significand generation that is more complex in terms of meeting circuit timings at a given clock frequency, and so the remaining description focuses on the generation of the significand. Any known technique may be used for calculating the sign and the exponent of the result.

Figure 4:
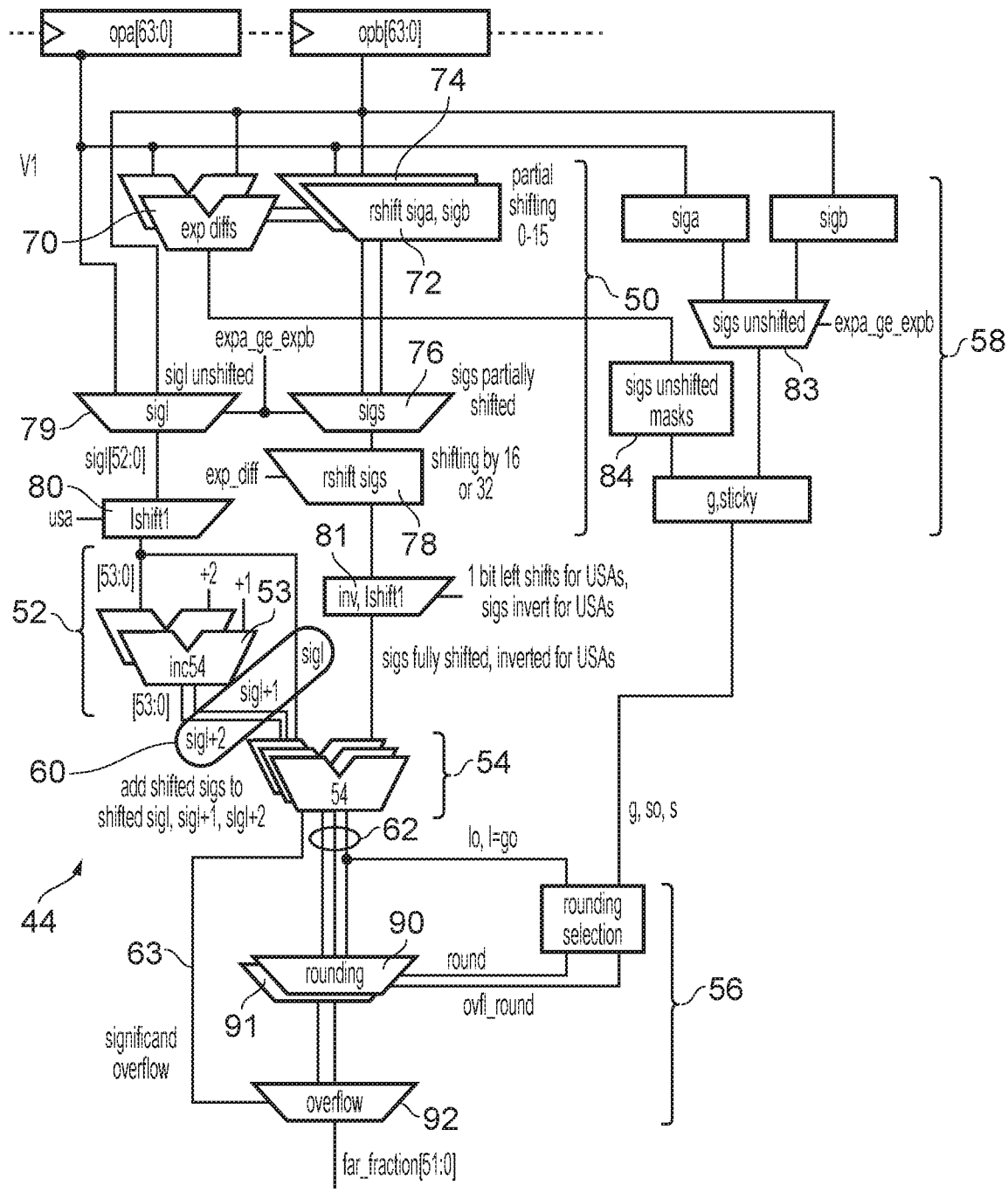
FIG. 4 shows the portion of the far-path circuit logic in more detail.

FIG. 4 shows the significand generating logic within the far-path adder 44 in more detail. In this example, the input to the far-path adder 44 is two 64-bit double-precision (DP) FP numbers, opa[63:0] and opb[63:0], comprising signs signa and signb, exponents expa[10:0] and expb[10:0], and fractions fraca[51:0] and fracb[51:0]. We construct significands siga[52:0] and sigb[52:0] by prepending a bit corresponding to whether the associated exponents are zero (0) or nonzero (1).

The alignment shift circuitry 50 right shifts the significand of the smaller number so that it aligns with the significand of the larger number. The alignment shift is given by the corresponding exponent difference, so if for example expa>expb, then we right shift sigb by expa-expb bit positions. There is a complication in that biased exponents 0 and 1 actually represent the same exponent (biased exponent 0 means a subnormal value if the fraction is non-zero), so if an exponent is 0 we substitute the exponent 1 when computing the exponent difference.

We begin the alignment shift without knowing which number has the larger exponent, so we actually do two subtractions using adders 70: expa-expb and expb-expa. The low-order bits of those subtractions are available earlier than the higher-order bits, so once a lower portion of expa-expb and expb-expa are available, first shift circuitry 72 begins shifting siga (by expb-expa) and second shift circuitry 74 starts shifting sigb (by expa-expb) so that we will have partially shifted results by the time we know which exponent is larger. There is no need to keep track of guard and sticky bits shifted out of the significand, and the shifted-out bits are simply discarded because we will have earlier information about the shifted-out bits by applying masks to the smaller operand before it is shifted using the rounding status determining circuitry 58. We also avoid a correction shift for a zero exponent because we have replaced exponent=0 with exponent=1.

Once it has been determined which of expa and expb is larger, selection circuitry 76 within the alignment shift unit 50 selects the output of the first shift circuitry 72 (partially shifted siga) if the operand opa has the smaller exponent, and selects the output of the second shift circuitry 74 (partially shifted sigb) if the operand opb has the smaller exponent. The one of siga and sigb corresponding to the smaller exponent is the smaller-operand significand sigs, and the other is the larger-operand sigl. Third shift circuitry 78 then completes the alignment shift of the smaller-operand significand sigs, based on the upper portion of the corresponding one of the first/second exponent difference values. That is, if the sigs multiplexer 76 selected partially shifted siga, then the third shift circuitry 78 shifts sigs based on upper bits of expb-expa, and if the sigs multiplexer 76 selects partially shifted sigb, the third shift circuitry 78 shifts sigs based on upper bits of expa-expb.

Meanwhile, a multiplexer 79 selects the larger-operand significand sigl once it has been determined which operand has the larger exponent. Note that unlike the sigs multiplexer 76, the sigl multiplexer 79 selects the unshifted version of sigl, not the partially shifted version of sigl resulting from the first/second shift circuits 72, 74.

Left shifters 80, 81 are provided on the signal paths passing sigl and shifted sigs to the incrementing circuitry 52 and adding circuits 54 respectively. These left shifters apply a 1-bit left shift when an USA is performed, and do not apply the 1-bit left shift when a LSA is performed. This is done to ensure that significand overflow happens at the same location regardless of whether a LSA or USA is performed, which makes the detection of overflows and the handling the rounding for overflows more straightforward. Also, the left shifter 81 on the sigs path inverts sigs if a USA is performed (and does not invert sigs for a LSA). This is because floating-point significands are represented as sign-magnitude, rather than two's complement, so to provide an USA it is needed to negate the smaller operand, which is done by inverting all the bits and adding 1. The addition of 1 is handled by controlling the carry input to each adding circuits 54 based on whether a LSA or USA is being performed and based on the guard/sticky flags. The carry in to the adding circuits 54 is zero for LSAs, zero for USAs with any bits set in guard or sticky flags, and one for USAs where the guard and sticky bits are all zero. This works because we would need to add 1 for a two's complement USA, but that additional one is added at the end of the shifted out bits, so the added one reaches the 54-bit adder only if all of the shifted out bits of the non-inverted version of sigs are zero (i.e. if the inverted version has all 1s for the shifted out bits).

Hence, the outputs of the left-shifters (either 1-bit shifted, or not shifted depending on whether a USA/LSA is performed) are provided to the incrementing circuitry 52 and adding circuits 54 respectively.

Meanwhile, in parallel with the alignment shift and selection of significands based on which exponent is larger, the rounding status determining circuitry 58 determines the guard and sticky flags g, s for determining whether to apply rounding increments. A multiplexer 83 selects the unshifted version of sigs, based on the determination of which of expa and expb is smaller.

Mask generating circuitry 84 constructs masks for applying to the unshifted version of sigs, first constructing an exponent difference sticky mask, ediff_smask[54:0] that has some number of zeros followed by exactly d trailing ones, where d is the exponent difference expl−exps (where expl is the larger of expa and expb and exps is the smaller of expa and expb). The mask ediff_smask[54:0] has a one corresponding to each bit that will eventually be shifted out of the smaller operand.

It is desirable to avoid needing a shifter for generating the mask ediff_smask[54:0], as this would incur a delay equivalent to the sigs shifting, which would negate the advantage of calculating the guard/sticky flags by masking in the first place. For DP floating-point, the exponent difference is an 11-bit value d comprising bits d10-d0, and one way of generating a mask in which the lower d bits are set to 1 and all other bits are set to 0 is using combinations of AND (&) and OR (|) gates designed according to the following logic (Emask[i] is shorthand for bit i of ediff_smask[54:0]):

```
d_ge_64 = d10 | d9 | d8 | d7 | d6
Emask [54] = d_ge_64 (d5& (d4& (d3 (d2& (d1&d0) ) ) ) );   // d >= 55
Emask [53] = d_ge_64 (d5& (d4& (d3 (d2&d1) ) ) );          // d >= 54
Emask [52] = d_ge_64 (d5& (d4& (d3 (d2& (d1 | d0) ) ) ) ); // d >= 53
Emask [51] = d_ge_64 (d5& (d4& (d3 d2) ) );                // d >= 52
Emask [50] = d_ge_64 (d5& (d4& (d3 (d2 (d1&d0) ) ) ) );    // d >= 51
Emask [49] = d_ge_64 (d5& (d4& (d3 (d2 d1) ) ) );          // d >= 50
Emask [48] = d_ge_64 (d5& (d4& (d3 (d2 (d1 | d0) ) ) ) );  // d >= 49
Emask [47] = d_ge_64 (d5&d4);                              // d >= 48
Emask [46] = d_ge_64 (d5& (d4 (d3& (d2& (d1&d0) ) ) ) );   // d >= 47
Emask [45] = d_ge_64 (d5& (d4 (d3& (d2&d1) ) ) );          // d >= 46
Emask [44] = d_ge_64 (d5& (d4 (d3& (d2& (d1 | d0) ) ) ) ); // d >= 45
Emask [43] = d_ge_64 (d5& (d4 (d3&d2) ) );                 // d >= 44
Emask [42] = d_ge_64 (d5& (d4 (d3& (d2 (d1&d0) ) ) ) );    // d >= 43
Emask [41] = d_ge_64 (d5& (d4 (d3& (d2 d1) ) ) );          // d >= 42
Emask [40] = d_ge_64 (d5& (d4 (d3& (d2 (d1 | d0) ) ) ) );  // d >= 41
Emask [39] = d_ge_64 (d5& (d4 d3) );                       // d >= 40
Emask [38] = d_ge_64 (d5& (d4 (d3 (d2& (d1&d0) ) ) ) );    // d >= 39
Emask [37] = d_ge_64 (d5& (d4 (d3 (d2&d1) ) ) );           // d >= 38
Emask [36] = d_ge_64 (d5& (d4 (d3 (d2& (d1 | d0) ) ) ) );  // d >= 37
Emask [35] = d_ge_64 (d5& (d4 (d3 d2) ) );                 // d >= 36
Emask [34] = d_ge_64 (d5& (d4 (d3 (d2 (d1&d0) ) ) ) );     // d >= 35
Emask [33] = d_ge_64 (d5& (d4 (d3 (d2 d1) ) ) );           // d >= 34
Emask [32] = d_ge_64 (d5& (d4 (d3 (d2 (d1 | d0) ) ) ) );   // d >= 33
Emask [31] = d_ge_64 (d5 d4);                              // d >= 32
Emask [30] = d_ge_64 (d5 (d4& (d3& (d2& (d1&d0) ) ) ) );   // d >= 31
Emask [29] = d_ge_64 (d5 (d4& (d3& (d2&d1) ) ) );          // d >= 30
Emask [28] = d_ge_64 (d5 (d4& (d3& (d2& (d1 | d0) ) ) ) ); // d >= 29
Emask [27] = d_ge_64 (d5 (d4& (d3&d2) ) );                 // d >= 28
Emask [26] = d_ge_64 (d5 (d4& (d3& (d2 (d1&d0) ) ) ) );    // d >= 27
Emask [25] = d_ge_64 (d5 (d4& (d3& (d2 d1) ) ) );          // d >= 26
Emask [24] = d_ge_64 (d5 (d4& (d3& (d2 (d1 | d0) ) ) ) );  // d >= 25
Emask [23] = d_ge_64 (d5 (d4&d3) );                        // d >= 24
Emask [22] = d_ge_64 (d5 (d4& (d3 (d2& (d1&d0) ) ) ) );    // d >= 23
Emask [21] = d_ge_64 (d5 (d4& (d3 (d2&d1) ) ) );           // d >= 22
Emask [20] = d_ge_64 (d5 (d4& (d3 (d2& (d1 | d0) ) ) ) );  // d >= 21
Emask [19] = d_ge_64 (d5 (d4& (d3 d2) ) );                 // d >= 20
Emask [18] = d_ge_64 (d5 (d4& (d3 (d2 (d1&d0) ) ) ) );     // d >= 19
Emask [17] = d_ge_64 (d5 (d4& (d3 (d2 d1) ) ) );           // d >= 18
Emask [16] = d_ge_64 (d5 (d4& (d3 (d2 (d1 | d0) ) ) ) );   // d >= 17
Emask [15] = d_ge_64 (d5 d4);                              // d >= 16
Emask [14] = d_ge_64 (d5 (d4 (d3& (d2& (d1&d0) ) ) ) );    // d >= 15
Emask [13] = d_ge_64 (d5 (d4 (d3& (d2&d1) ) ) );           // d >= 14
Emask [12] = d_ge_64 (d5 (d4 (d3& (d2& (d1 | d0) ) ) ) ); // d >= 13
Emask [11] = d_ge_64 (d5 (d4 (d3&d2) ) );                  // d >= 12
Emask [10] = d_ge_64 (d5 (d4 (d3& (d2 (d1&d0) ) ) ) );     // d >= 11
Emask [9]  = d_ge_64 (d5 (d4 (d3& (d2 d1) ) ) );           // d >= 10
Emask [8]  = d_ge_64 (d5 (d4 (d3& (d2 (d1 | d0) ) ) ) );   // d >= 9
Emask [7]  = d_ge_64 (d5 (d4 d3) );                        // d >= 8
Emask [6]  = d_ge_64 (d5 (d4 (d3 (d2& (d1&d0) ) ) ) );     // d >= 7
Emask [5]  = d_ge_64 (d5 (d4 (d3 (d2&d1) ) ) );            // d >= 6
```

-continued

```
Emask [4] = d_ge_64 (d5 (d4 (d3 (d2& (d1 | d0) ) ) ) );    // d >= 5
Emask [3] = d_ge_64 (d5 (d4 (d3 d2) ) );                   // d >= 4
Emask [2] = d_ge_64 (d5 (d4 (d3 (d2 (d1&d0) ) ) ) );       // d >= 3
Emask [1] = d_ge_64 (d5 (d4 (d3 (d2 d1) ) ) );             // d >= 2
Emask [0] = d_ge_64 (d5 (d4 (d3 (d2 (d1 | d0) ) ) ) );     // d >= 1
```

Hence, by generating the exponent difference mask using combinatorial logic instead of shifter, it can be generated faster.

There is a slight complication in that significands for effective subtractions (unlike-signed adds, or USAs) are left shifted by one bit position using shifters 80, 81 as discussed above, so that significand overflow happens at the same location as effective additions (like-signed adds, or LSAs). This left shift is compensated for by a 1-bit right shift of ediff_smask for USAs, so that the correct guard bit can still be selected event when the artificial 1-bit left shift is applied to the significands. The highest order '1' bit in the exponent difference mask ediff_smask represents the position of the guard bit, and we find it using gmask:

gmask0[53:0]=ediff_smask[53:0]^ediff_smask[54:1];
gmask[52:0]=({53{~usa_v1}}& f_gmask0[52:0])
    |({53{usa_v1}}& f_gmask0[53:1]);

The XOR (^) creating gmask0 locates the first nonzero bit, and the gmask mux chooses between LSA (unshifted) and USA (1-bit right shifted) versions.

The remaining '1' bits in the exponent difference mask represent bit positions of shifted-out bits used to form the sticky flag, so a sticky mask is formed by right-shifting ediff_smask one additional position, and again choosing between USA and LSA versions.

smask[52:0]=({53{~usa_v1}}& ediff_smask[53:1])
    |({53{usa_v1}}& ediff_smask[54:2]);

Hence, the sticky bit s (sticky rounding status flag) is given applying the mask to the unshifted smaller significand sigs[52:0] and seeing if any bits are set using a reduction OR (not a bitwise OR—a reduction OR results corresponds to each individual bit within the same binary value ORed together, e.g. . . . (bit 3|(bit2|(bit 1|bit 0), etc.):

assign s=|(sigs_unshifted[52:0]& smask[52:0]);

We don't have to worry about whether the operation is LSA or USA when computing this final sticky bit because the shifted-out bits are negated for USAs. This means shifted out bits of all zeros will remain zero (because –0=0), and shifted-out bits with any one set will remain nonzero (because –nonzero is still nonzero).

The guard bit is a bit more complicated.

raw_g=|(sigs_unshifted[52:0] & gmask[52:0]);

For LSAs, f_raw_g is the guard bit. However, USAs invert the guard bit, and then invert it again if there is a carry-in from the lower-order bits. We only get this carry-in if s is zero, so g is given by:

g_cin=~s & usa;
g=(raw_g^usa)^g_cin;

Either LSAs or USAs can have a carry-out of their high-order bit, a condition we call significand overflow. It causes g and s to occur one bit to the left as compared to the non-significand-overflow location. This is accounted for by a bit of additional logic ovfl_s=raw_g|s;

The value ovfl_g (guard flag for cases of overflow) is exactly the same as bit 0 of the unrounded sum (sigs+sigh, and since this is produced much earlier than the rest of the sum we don't need to precompute ovfl_g using the rounding determination circuitry 58, instead ovfl_g will be available from the adder circuit 54 which adds sigs and sigl.

Given the two low-order bits of the unrounded sum ovfl_l and l, we can precisely compute rounding in the usual way (as shown in Table 1 above).

The next issue is the rounding increment, which can happen in the non-overflow case (sum+1) or the overflow case (sum+2). Given the aim of fitting the logic depth into a single clock cycle, and the relatively higher frequency, there is no time for this additional increment after the sum has been produced by adder circuits 54, or even for a 3:2 CSA in front of the final adder(s), so how do we get this increment?

The answer is to notice that while the smaller operand is being shifted, the larger operand is mostly doing nothing (not quite nothing—there is a one bit left shift for USAs at shifter 80 as discussed above), but this is done very early). We can use the much longer smaller-operand shift time to increment the larger operand in two places, so that we end up with three larger operands: sigl, sigl+1, and sigl+2. These incremented values align exactly with the rounding locations for the final sum. Hence, incrementing circuitry 52 includes two adders, one to determine sigl+1 and the other to determine sigl+2. The results, together with the incremented version of sigl are passed to the adder circuits 54 as three alternative versions of sigl.

The three adder circuits 54 compute the three final sums:
(1) sigl+shifted_sigs
(2) sigl+1+shifted_sigs
(3) sigl+2+shifted_sigs One of these values is the correctly rounded far-path sum, and the selection circuitry 56 uses the precomputed rounding information (l,g,s,ovfl_l,ovfl_g,ovfl_s) as well as the overflow indication 63 to choose the correct answer. Of these rounding status flags, g, s and ovfl_s have been calculated by the rounding status determining circuitry 58 using masking as discussed above. The non-overflow least significant bit flag (l) and the overflow guard flag (ovfl_g) both equal to the least significant bit of the sum sigl+shifted_sigs performed by one of the adding circuits 54, and the overflow least significant bit flag (l) equals the second least significant bit of the sum sigl+shifted_sigs.

In fact, the rounding information is available long before we know whether significand overflow has occurred, so the selection circuitry actually comprises three multiplexers: first and second multiplexers (rounding selection circuitry) 90, 91 first choose between the unincremented and incremented values for the non-overflow and overflow cases respectively. Hence, first rounding selection circuitry 90 selects the first candidate sum value sigl+shifted_sigs if, based on the selected rounding mode, the non-overflow set of rounding status flags (l, g, s) indicate no increment is needed according to Table 1 above, and selects the second candidate sum value sigl+1+shifted_sigs if an increment is needed according to l, g, s for the currently selected rounding mode. The second rounding selection circuitry selects the first candidate sum value sigl+shifted_sigs if, for the current selected rounding mode, the overflow set of rounding status flags (ovfl_l, ovfl_g, ovfl_s) indicate that, according to the logic shown in Table 1, no rounding increment is needed, and selects the third candidate sum value sigl+2+shifted_sigs if the overflow set of rounding status flags indicate that a rounding increment is needed for the selected rounding mode. The selected rounding mode could be indicated in a control register, or in a parameter specified by the instruction which causes the processor to perform the floating-point addition. A third multiplexer (overflow selection circuitry) 92 then selects between the outputs of the first and second multiplexers 90, 91 based on the overflow indication 63. Hence, if the overflow indication 63 indicates that an overflow occurred, then the output of the second multiplexer 91 is used as the final result, and if no overflow occurred then the output of the first multiplexer 90 is selected as the final result. The overflow indication 63 is equal to the upper bit of the sum sigl+shifted_sigs if the rounding status flags indicate no increment is required, or equal to the upper bit of the sum sigl+1+shifted_sigs if the rounding status flags indicate an increment is required.

Figure 5:
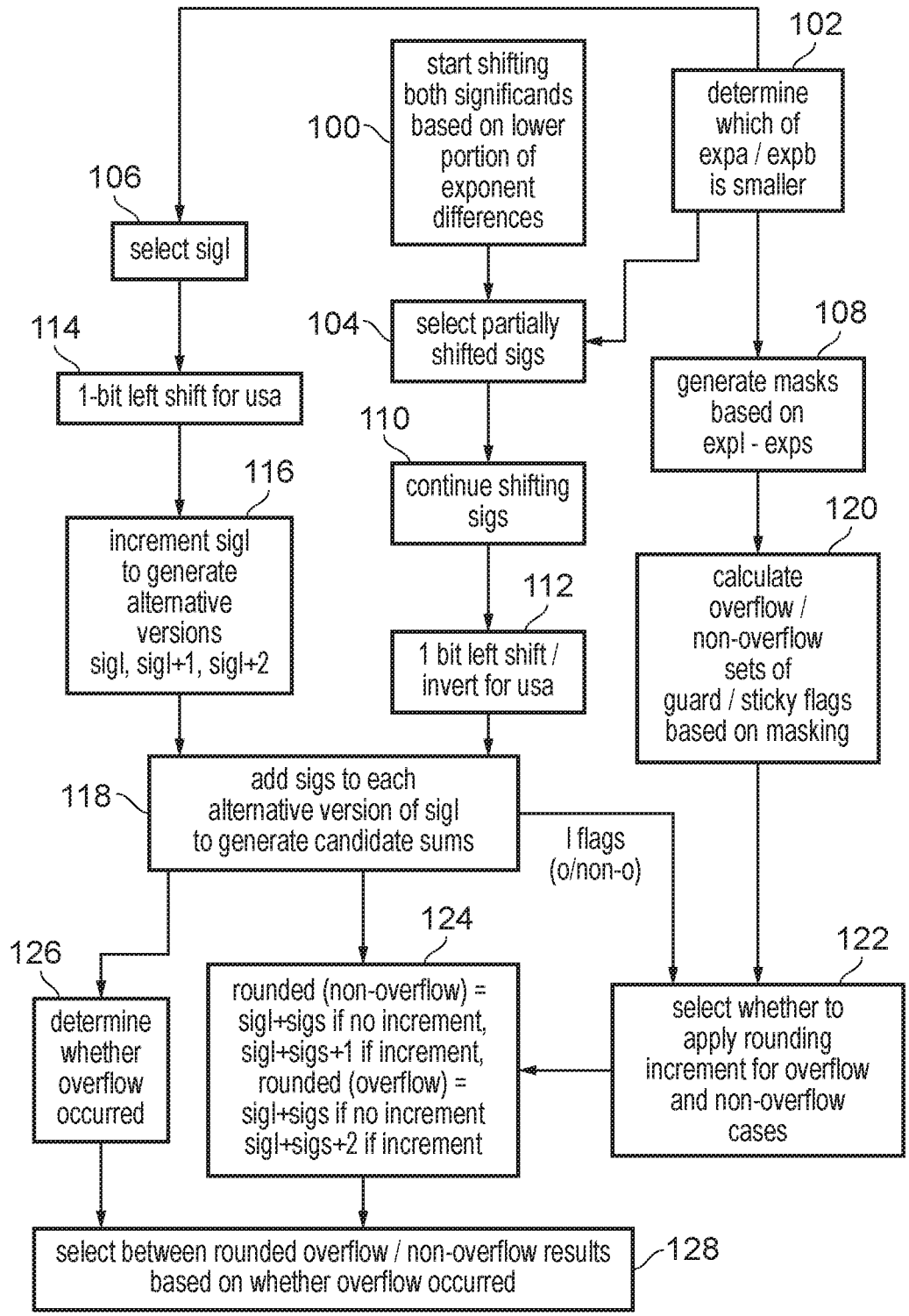
FIG. 5 is a flow diagram showing a method of handling additions for the far-path.

FIG. 5 is a flow diagram showing a method of processing floating-point additions of operands opa, opb in the far path using the circuit logic of FIG. 4. At step 100 the alignment shift circuitry starts shifting both significands of operands opa, opb based on a lower portion of bits of respective exponents differences (expb−expa, expa−expb). Meanwhile, at step 102 it is determined which of the exponents expa, expb is smaller. When it has been determined which operand has the smaller exponent, then at step 104 then the multiplexer 76 of the alignment shift circuitry 50 selects the partially shifted version of the smaller operand's significand, sigs. Also at step 106 the multiplexer 79 selects the larger operand significand sigl. Also, at step 108 the rounding status determining circuitry 58 starts generating the rounding masks based on the exponent difference expl−exps, where expl is the larger exponent of expa and expb, and exps is the smaller exponent.

At step 110 the alignment shift circuitry 50 continues to shift the smaller-operand significand sigs based on upper bits of the exponent difference expl−exps, and also at step 112 if the operation is an unlike-signed-addition then an additional 1-bit left shift is applied by shifter 81 and the shifted smaller-operand significand is also inverted to handle the two's complementing of the smaller operand's significand.

Similarly, at step 114 if the operation is an USA then a 1-bit left shift is applied to the larger operand significand sigl (no shift is performed on sigl for LSAs). At step 116 the incrementing circuitry 52 generates alternative versions of the larger-operand significand sigl corresponding to different rounding increments of 0, 1 and 2 respectively. The larger operand significand sigl is simply passed through unchanged to generate the first alternative version sigl, but the second and third alternative versions based on rounding increments of 1 and 2 respectively are generated by carry propagate adders 53 of the incrementing circuitry 52.

At step 118 the respective adding circuits 54 each add one of the alternative versions of the larger operand significand sigl generated at step 116 to the shifted smaller-operand sigs generated by the alignment shift circuitry 50 and shifter 81. The carry in to each adding circuit 54 is determined as 0 for LSAs or USAs or 1 for USAs where the guard and sticky bits are all zero. The additions performed by each adding circuit 54 produce a number of candidate sum values 62 which each represent a possible rounded sum result which could be selected depending on the rounding status and the presence or absence of overflow.

Meanwhile, in parallel with the incrementing and the shift of the smaller-operand significand, at step 120 the rounding status determining circuitry 58 uses the masks generated at step 108 to calculate respective overflow and non-overflow sets of sticky flags, and a non-overflow guard flag, using the masking logic discussed above. The adding circuit 54 which adds the unincremented larger-operand significand sigl to the shifted smaller operand sigs also provides overflow and non-overflow versions of the least significant bit flag, and the overflow version of the guard flag, which equals the non-overflow least significant bit flag.

At step 122 the overflow and non-overflow sets of rounding status flags are used to make two separate selections of whether to apply a rounding implement, one for the overflow case and another for the non-overflow case. At step 124 a selection of a rounded non-overflow result is made, either using the first candidate sum value which corresponds to a rounding increment of 0 if the current rounding mode and status flags for the non-overflow case indicate no increment should be applied, or selecting the second candidate sum value corresponding to a rounding increment of 1 if an increment is to be applied in the non-overflow case. Similarly, based on the overflow set of rounding status flags and the current rounding mode, it is determined whether an increment is needed or not for the overflow case, and if no increment is needed then the alternative candidate sum value based on the version of the larger operand significand sigl with a rounding increment of 0 is used while if a rounding increment is required for the overflow case then the candidates sum corresponding to the alternative sigl version with a rounding increment of 2 is selected.

In parallel with the selection at steps 122, 124, at step 126 it is determined based on the addition by the adding circuits 54 whether an overflow occurs, and once the overflow indication 63 is ready then at step 128 the overflow selection circuit determines which of the rounded non-overflow and overflow results obtained at step 124 should be selected as the final normalised and rounded result of the far-path addition of operands opa, opb.

Hence it can be seen that much of the processing for rounding, including the incrementing by the incrementing circuitry 52 and the calculation of the rounding status flags by rounding status determining circuitry 58, can be performed in parallel with the shifting of the smaller-operand significand sigs by the alignment shift circuitry 50, which enables the far-path addition to be packed into a single clock cycle even at relatively high clock frequencies. This provides a significant performance boost.

Worked Example

A worked example of a floating-point addition using this technique is shown below. For this example we use a strange hybrid representation consisting of binary significand and decimal exponent. No machine does this, but it makes for a clean explanation.

Far path operations generally require alignment because we can only add or subtract bits that represent the same power of two. So if we have to compute opa−opb=$1.1 \times 2^6 - 1.01 \times 2^{-15}$ we first have to align the smaller operand to the larger. We do this by right shifting the significand (and implicitly incrementing the exponent) of the smaller operand until the two exponents are equal, transforming the problem into the equivalent $1.1 \times 2^6 - 0.000000000000000000000101 \times 2^6$ When we start the operation, we don't know which exponent is larger, so we do two exponent differences 6−(−15)=21 (binary 010101) and −15−6=−21 (binary 101011). The low-order bits of the subtraction are available earlier than the high order bits, so we begin shifting significands with two different right shifts:

Assuming siga is larger, we begin to right shift sigb by 010101
1.01->0.101 (shift by one for the low-order shift bit)
    ->0.101 (no shift by two because next shift bit is zero)
    ->0.0000101 (shift by four)
    ->0.0000101 (no shift by eight)
Assuming sigb is larger, we begin to right shift siga by 101011
1.1->0.11 (shift by one for the low-order shift bit)
    ->0.0011 (shift by two)
    ->0.0011 (no shift by four)
    ->0.000000000011 (shift by eight)

After this much shifting we know which exponent difference is positive, so we know that sigb is the smaller and we finish shifting sigs=sigb.
    ->0.00000000000000000000101 (shift by 16)
    ->0.00000000000000000000101 (no shift by 32)
sigl is just the unshifted siga=1.1

When we add or subtract sigl and sigs there might be a carry out of the most significant bit, something we refer to as significand overflow. It simplifies our processing to have that carry out in one predefined location, something we achieve by doing a 1-bit left shift on both sigl and sigs for unlike-signed adds (USAs, also known as effective subtractions). USAs also require that sigs be inverted (definition of twos complement subtraction is sigl+~sigs+1). The shifted sigs (expanded to 53-bit binary) is
0_0000_0000_0000_0000_0000_1010_0000_0000_
    0000_0000_0000_0000_0000

The inverted and USA-1-bit-left-shifted sigs (54-bit binary) is
11_1111_1111_1111_1111_1110_1011_1111_1111_
    1111_1111_1111_1111_1111

While we shifting sigs, we compute rounding information using the unshifted sigs. We make a mask ediff_smask[54:0] based on the exponent difference d=expl-exps (d=21 in this case). Details of the mask construction are shown above. The mask consists of 34 zeros followed by exactly 21 ones. We manipulate this mask using logical XOR to get assign gmask0[53:0]=ediff_smask[53:0]^ediff_smask[54:1];
a mask with 33 zeros followed by a single 1 followed by 20 zeros. That mask is used to identify the guard bit g. Because we do a 1-bit left shift of sigs for USAs, the mask must also be left shifted one bit for USAs (this means we can find the correct g for both USAs and LSAs by applying the mask to the unshifted sigs).
assign gmask[52:0]=({53 {~usa}} & gmask0[52:0])
    |({53 {usa}} & gmask0[53:1]);
We now use the mask to locate g in the unshifted sigs
raw_g=|(sigs_unshifted[52:0] & gmask[52:0]);

In our example raw_g is zero. We use similar masking techniques to calculate sticky (s)
assign smask[52:0]=({53{~usa}} & ediff_smask[53:1])
    |({53 {usa}} & ediff_smask[54:2]);
assign s=|(sigs_unshifted[52:0] & smask[52:0]);
s is also zero in our example.

So far we have only compute raw_g, which is the guard bit before possible change due to USA logic. Recall that USAs invert sigs and add 1, so the true guard bit requires a bit more computation:
assign g_cin=~s & usa; //carry-in to guard bit
assign g=(raw_g^usa)^gcin;

We don't try to precompute l, the least significant bit of sigl-sigs because it is available very early out of the adder. Given l,g,s we can now compute rounding. In this example g=s=0, so there is no rounding increment.

Very similar logic is used to compute lo,go,so (the significand overflow versions of l,g,s). Again go=so=0, so there is no rounding increment for the result in the case of significand overflow.

Rounding for the non-overflow case of the subtraction chooses between (sigl-sigs) and (sigl-sigs+1).
We notice that sigl-sigs+1=(sigl+1)-sigs
Since there is very little logic on the sigl path, we fill the void by computing sigl+1. Similarly, rounding for the overflow case of the subtraction chooses between (sigl-sigs) and (sigl-sigs+2),
and sigl-sigs+2=(sigl+2)-sigs, so we also compute sigl+2.
We then compute 3 different sums:
(1) sigl-sigs
(2) (sigl+1)-sigs
(3) (sigl+2)-sigs
The rounding multiplexers choose:
(non-significand overflow) between (1) and (2)
(significand overflow) between (1) and (3)
In our example, we always choose the unincremented value (1) because g=s=go=so=0.

Finally we choose between the overflow and non-overflow cases. The overflow case happens when bit 53 of sigl-sigs is set, or if we have a rounding increment and bit 53 of (sigl+1)-sigs is set. Our final sum (opl+~'ops+1) is
11_0000_0000_0000_0000_0000_0000_0000_0000_
    0000_0000_0000_0000_0000
    11_1111_1111_1111_1111_1110_1011_1111_1111_
    1111_1111_1111_1111_1111 1
which gives
10_1111_1111_1111_1111_1110_1100_0000_0000_
    0000_0000_0000_0000_0000
bit 53 is set, so we pick the overflow result (bits 53:1).

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. Floating-point adding circuitry to add first and second floating-point operands each comprising a significand and an exponent; the floating-point adding circuitry comprising:
    alignment shift circuitry to shift a smaller-operand significand to align the smaller-operand significand with a larger-operand significand, based on an exponent difference representing a difference between the exponents of the first and second floating-point operands, where the smaller-operand significand is the significand of the one of the first and second floating-point operands having the smaller exponent, and the larger-operand significand is the significand of the other of the first and second floating-point operands having the larger exponent;
    incrementing circuitry to generate a plurality of alternative versions of the larger-operand significand, each alternative version of the larger-operand significand based on a different rounding increment applied to the larger-operand significand;

a plurality of adding circuits to generate a plurality of candidate sum values, each candidate sum value representing a sum of a shifted smaller-operand significand generated by the alignment shift circuitry and a respective one of the alternative versions of the larger-operand significand generated by the incrementing circuitry;

selection circuitry to select, based on a plurality of rounding status flags, one of the candidate sum values generated by the plurality of adding circuits, the selected sum value representing a rounded result of adding the first and second floating-point operands; and rounding status determining circuitry to determine a subset of the plurality of rounding status flags based on an unshifted version of the smaller-operand significand.

2. The floating-point adding circuitry according to claim 1, in which the incrementing circuitry is configured to perform at least one addition, each addition adding a respective rounding increment to the larger-operand significand; wherein the incrementing circuitry is configured to perform said at least one addition in parallel with the alignment shift circuitry performing at least part of the shift of the smaller-operand significand.

3. The floating-point adding circuitry according to claim 1, in which the plurality of alternative versions of the larger-operand significand comprise:
a first version for which the rounding increment is 0;
a second version for which the rounding increment is 1; and
a third version for which the rounding increment is 2.

4. The floating-point adding circuitry according to claim 1, in which the rounding status determining circuitry is configured to perform at least part of a determination of said subset of the plurality of rounding status flags in parallel with the alignment shift circuitry performing at least part of the shift of the smaller-operand significand.

5. The floating-point adding circuitry according to claim 1, in which the rounding status determining circuitry is configured to determine at least one mask based on the exponent difference, and determine said subset of the plurality of rounding status flags based on masking of said unshifted version of the smaller-operand significand using said at least one mask.

6. The floating-point adding circuitry according to claim 1, in which said subset of the plurality of rounding status flags comprise at least one guard flag and at least one sticky flag.

7. The floating-point adding circuitry according to claim 6, in which said plurality of rounding status flags also comprise at least one least significant bit flag determined based on an addition performed by one of said plurality of adding circuits.

8. The floating-point adding circuitry according to claim 1, in which the selection circuitry is configured to select said one of the candidate sum values based on a plurality of rounding status flags and an overflow indication indicating whether addition of aligned significands of the first and second floating-point operands causes an overflow.

9. The floating-point adding circuitry according to claim 8, comprising rounding status determining circuitry, in which:
the rounding status determining circuitry and at least one of the adding circuits are configured to determine a non-overflow set of rounding status flags assuming absence of overflow and an overflow set of rounding status flags assuming presence of overflow, before a result of determining whether overflow has occurred is available.

10. A data processing apparatus comprising the floating-point adding circuitry of claim 1.

11. Floating-point adding circuitry to add first and second floating-point operands each comprising a significand and an exponent the floating-point adding circuitry comprising:
alignment shift circuitry to shift a smaller-operand significand to align the smaller-operand significand with a larger-operand significand, based on an exponent difference representing a difference between the exponents of the first and second floating-point operands, where the smaller-operand significand is the significand of the one of the first and second floating-point operands having the smaller exponent, and the larger-operand significand is the significand of the other of the first and second floating-point operands having the larger exponent;
incrementing circuitry to generate a plurality of alternative versions of the larger-operand significand, each alternative version of the larger-operand significand based on a different rounding increment applied to the larger-operand significand;
a plurality of adding circuits to generate a plurality of candidate sum values, each candidate sum value representing a sum of a shifted smaller-operand significand generated by the alignment shift circuitry and a respective one of the alternative versions of the larger-operand significand generated by the incrementing circuitry; and
selection circuitry to select one of the candidate sum values generated by the plurality of adding circuits, the selected sum value representing a rounded result of adding the first and second floating-point operands; in which:
the selection circuitry is configured to select said one of the candidate sum values based on a plurality of rounding status flags and an overflow indication indicating whether addition of aligned significands of the first and second floating-point operands causes an overflow; and
the selection circuitry comprises:
first rounding selection circuitry to select between a first candidate sum value and a second candidate sum value based on non-overflow rounding status flags determined assuming absence of overflow;
second rounding selection circuitry to select between the first candidate sum value and a third candidate sum value based on overflow rounding status flags determined assuming presence of overflow; and
overflow selection circuitry to select between outputs of the first rounding selection circuitry and the second rounding selection circuitry, based on the overflow indication, to provide said selected sum value representing the rounded result of adding the first and second floating-point operands.

12. The floating-point adding circuitry according to claim 11, in which the first rounding selection circuitry and the second rounding selection circuitry are configured to determine which candidate sum value to select in parallel with at least part of determination of the overflow indication.

13. The floating-point adding circuitry according to claim 11, in which:

the first candidate sum value is based on a first version of the larger-operand significand for which the rounding increment is 0;

the second candidate sum value is based on a second version of the larger-operand significand for which the rounding increment is 1; and the third candidate sum value is based on a third version of the larger-operand significand for which the rounding increment is 2.

14. The floating-point adding circuitry according to claim 1, in which the alignment shift circuitry is configured to start shifting both the significands of the first and second floating-point operands before a result of determining which of the first and second floating-point operands has the smaller exponent is available.

15. Floating-point adding circuitry to add first and second floating-point operands each comprising a significand and an exponent the floating-point adding circuitry comprising:

alignment shift circuitry to shift a smaller-operand significand to align the smaller-operand significand with a larger-operand significand, based on an exponent difference representing a difference between the exponents of the first and second floating-point operands, where the smaller-operand significand is the significand of the one of the first and second floating-point operands having the smaller exponent, and the larger-operand significand is the significand of the other of the first and second floating-point operands having the larger exponent;

incrementing circuitry to generate a plurality of alternative versions of the larger-operand significand, each alternative version of the larger-operand significand based on a different rounding increment applied to the larger-operand significand;

a plurality of adding circuits to generate a plurality of candidate sum values, each candidate sum value representing a sum of a shifted smaller-operand significand generated by the alignment shift circuitry and a respective one of the alternative versions of the larger-operand significand generated by the incrementing circuitry;

selection circuitry to select one of the candidate sum values generated by the plurality of adding circuits, the selected sum value representing a rounded result of adding the first and second floating-point operands; in which:

the alignment shift circuitry comprises:

first shift circuitry to generate a first shifted value by shifting the significand of the first floating-point operand based on a lower portion of a first exponent difference value corresponding to a result of subtracting the exponent of the first floating-point operand from the exponent of the second floating-point operand;

second shift circuitry to generate a second shifted value by shifting the significand of the second floating-point operand based on a lower portion of a second exponent difference value corresponding to a result of subtracting the exponent of the second floating-point operand from the exponent of the first floating-point operand;

significand selection circuitry to select the first shifted value when the first floating-point operand has the smaller exponent and to select the second shifted value when the second floating-point operand has the smaller exponent; and third shift circuitry to shift the one of the first shifted value and the second shifted value selected by the significand selection circuitry, based on an upper portion of a corresponding one of the first and second exponent difference values.

16. The floating-point adding circuitry according to claim 15, in which the third shift circuitry is configured to perform its shift in parallel with the incrementing circuitry generating the plurality of alternative versions of the larger-operand significand.

* * * * *